(12) United States Patent
Martinez

(10) Patent No.: US 12,529,458 B2
(45) Date of Patent: *Jan. 20, 2026

(54) ENERGY MANAGEMENT OF A PORTABLE SOLAR LIGHTING TOWER

(71) Applicant: National Signal LLC, Fullerton, CA (US)

(72) Inventor: Guadalupe Martinez, La Habra, CA (US)

(73) Assignee: National Signal LLC, Fullerton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/923,128

(22) Filed: Oct. 22, 2024

(65) Prior Publication Data

US 2025/0043929 A1 Feb. 6, 2025

Related U.S. Application Data

(63) Continuation of application No. 18/451,117, filed on Aug. 17, 2023, now Pat. No. 12,152,758, which is a continuation of application No. 17/808,980, filed on Jun. 24, 2022, now Pat. No. 11,767,955, which is a
(Continued)

(51) Int. Cl.
*F21S 9/03* (2006.01)
*F21V 23/04* (2006.01)
*F21Y 115/10* (2016.01)

(52) U.S. Cl.
CPC .......... *F21S 9/035* (2013.01); *F21V 23/0435* (2013.01); *F21V 23/0471* (2013.01); *F21Y 2115/10* (2016.08)

(58) Field of Classification Search
CPC .......... F21S 9/035; F21S 9/03; F21V 23/0435; F21V 23/0471; F21V 23/045; F21Y 2115/10; F21L 4/00; F21L 4/08
See application file for complete search history.

(56) References Cited

U.S. PATENT DOCUMENTS

| 4,600,980 A | 7/1986 | Dahlgren |
| 5,542,203 A | 8/1996 | Luoma |
| 7,135,990 B2 | 11/2006 | Richardson |

(Continued)

FOREIGN PATENT DOCUMENTS

| CN | 102638922 A | 8/2012 |
| CN | 202385351 U | 8/2012 |

(Continued)

*Primary Examiner* — Bao Q Truong
(74) *Attorney, Agent, or Firm* — DANE IP Law PC

(57) ABSTRACT

A method and apparatus for the energy management of a portable solar lighting tower is disclosed. The portable solar lighting tower may have multiple modes and functions to adjust the power of the light and adapt the demanded energy of the lighting tower to overlap with the supply of solar energy during the days. Such modes and functions may easily be set and modified using a control panel on the portable solar lighting tower or on an external computer, such as a computer tablet. Additionally, an energy management graph may be displayed on the control panel accessed via the computer tablet that further allows a user to determine whether there exists enough solar energy for the desired power output of the portable solar lighting tower.

15 Claims, 7 Drawing Sheets

Related U.S. Application Data continuation-in-part of application No. 29/731,517, filed on Jun. 1, 2020, now Pat. No. Des. 1,003,254.

(56) References Cited

U.S. PATENT DOCUMENTS

| | | | |
|---|---|---|---|
| 7,795,837 B1* | 9/2010 | Haun | H02S 10/40 |
| | | | 320/101 |
| 7,953,517 B1 | 5/2011 | Porter | |
| D680,060 S | 4/2013 | Gago | |
| 9,115,879 B1 | 8/2015 | Barker | |
| 9,428,100 B2 | 8/2016 | Sharpley | |
| 9,810,387 B2 | 11/2017 | Knodel | |
| 10,374,451 B2 | 8/2019 | Curlett | |
| D964,296 S | 9/2022 | Bruss | |
| D968,249 S | 11/2022 | Ueda | |
| D971,861 S | 12/2022 | Schemmel | |
| 11,767,955 B2* | 9/2023 | Martinez | F21S 9/035 |
| | | | 362/157 |
| 12,152,758 B2* | 11/2024 | Martinez | F21L 4/00 |
| 2010/0232148 A1* | 9/2010 | Sharpley | F21V 21/22 |
| | | | 362/183 |
| 2012/0201015 A1 | 8/2012 | Robertson | |
| 2013/0211844 A1 | 8/2013 | Sadwick | |
| 2014/0240968 A1* | 8/2014 | Brown | F21V 21/22 |
| | | | 362/183 |
| 2020/0366125 A1 | 11/2020 | Chen | |

FOREIGN PATENT DOCUMENTS

| | | |
|---|---|---|
| KR | 100688035 B1 | 3/2007 |
| WO | 2004104606 A1 | 12/2004 |

* cited by examiner

ENERGY MANAGEMENT OF A PORTABLE SOLAR LIGHTING TOWER

CROSS-REFERENCE TO RELATED APPLICATIONS

This application is a continuation application of U.S. patent application Ser. No. 18/451,117, filed on 2023 Aug. 17, which is continuation application of U.S. patent application Ser. No. 17/808,980, filed on 2022 Jun. 24, now U.S. Pat. No. 11,767,955, which is a continuation in part application of U.S. Design patent application No. 29731517, filed on 2020 Jun. 1, now U.S. Design patent No. D1003254, the entire contents of which are expressly incorporated herein by reference.

STATEMENT RE: FEDERALLY SPONSORED RESEARCH/DEVELOPMENT

Not Applicable

BACKGROUND

The various embodiments and aspects described herein relate to a portable solar lighting tower and methods, modes, and features for managing the energy/power usage of said lighting tower.

A portable solar lighting tower may be used to illuminate a project site, such as a construction zone, during the evenings when the sun has set and when the site is dark. The benefit of using a solar lighting tower is that the power of the lighting comes from an environmentally friendly source, which is mainly solar energy. The drawback of using a solar lighting tower is that the power output of the device is limited to the amount of energy that the device can harvest and store from the sun during daylight. And the solar energy varies depending on the time of year and the type of weather of where the portable solar lighting tower is located.

Accordingly, there is a need in the art for an improved device, methods, modes, and features for managing the power usage of a portable solar lighting tower to ensure that the device has enough power to light the project site during the evenings.

BRIEF SUMMARY

The various embodiments and aspects disclosed herein address the needs discussed above, discussed below and those that are known in the art.

A method and apparatus for the energy management of a portable solar lighting tower operated at a project site, such as a construction zone, is disclosed. A portable solar lighting tower may not be able to emit light at a high brightness in the evenings because of the scarcity of solar energy at where the lighting tower is located. As a result, the portable solar lighting tower may need multiple modes and functions to adjust the power of the light produced and adapt the demanded energy of the lighting tower to overlap with the supply of the solar energy provided during the day. Such modes and functions may include, but not limited to, choosing the level of brightness and when and which of the lamps of the lighting tower should turn on and off. Such modes and functions may be easily activated and modified using a control panel on the portable solar lighting tower or on an external computer, such as a computer tablet. Additionally, an energy management graph may be displayed on the control panel shown on the computer tablet that further allows a user to determine whether enough supply of solar energy exists for the desired power output. The energy management graph may have one or more curves representing the energy/power demanded by the lighting tower at different configurations and a curve representing the solar energy/power available at the location of the lighting tower. The user may then use such graph to plan the energy output of the portable solar lighting tower accordingly.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
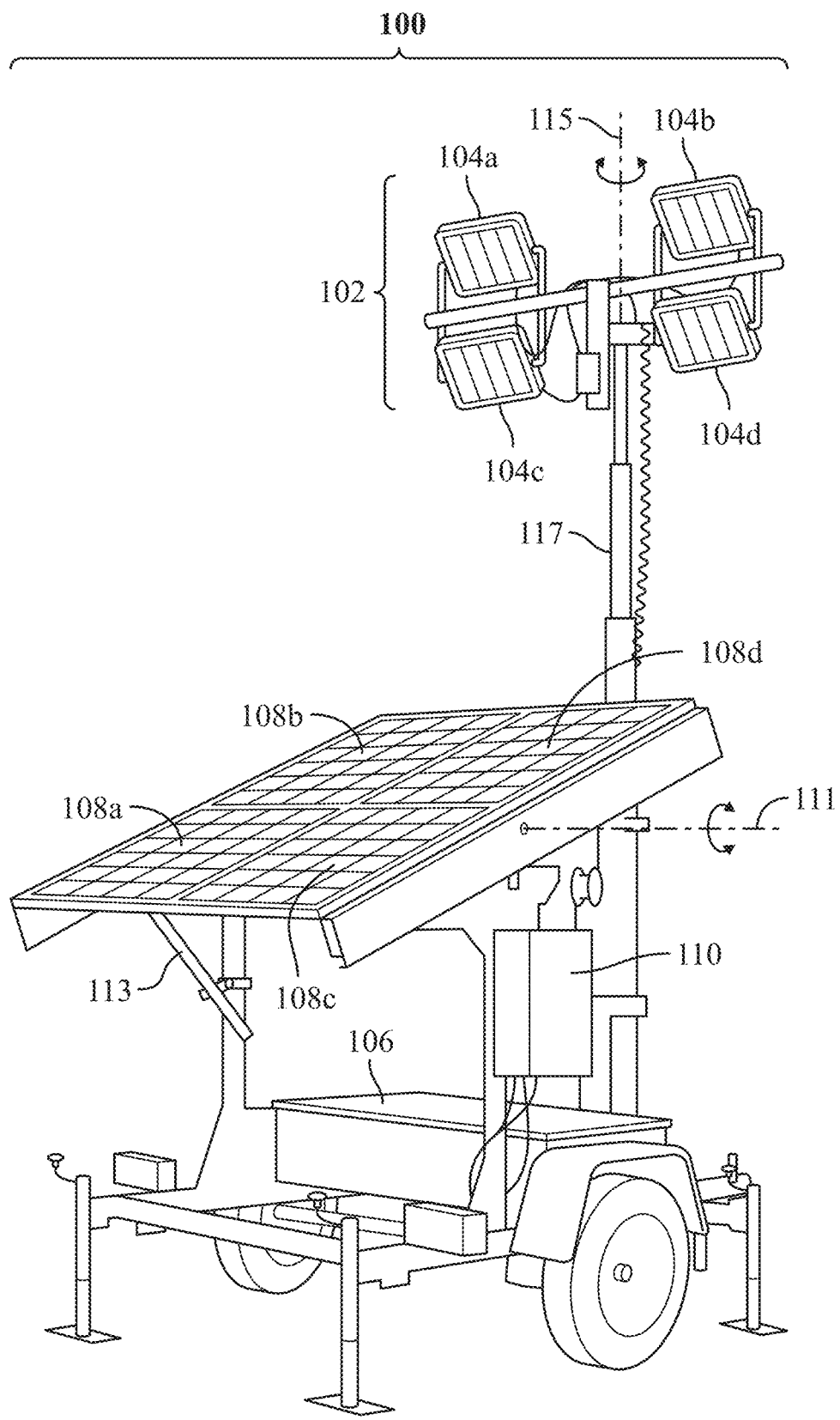
FIG. 1 is a perspective view of a portable solar lighting tower.
Figure 4A:
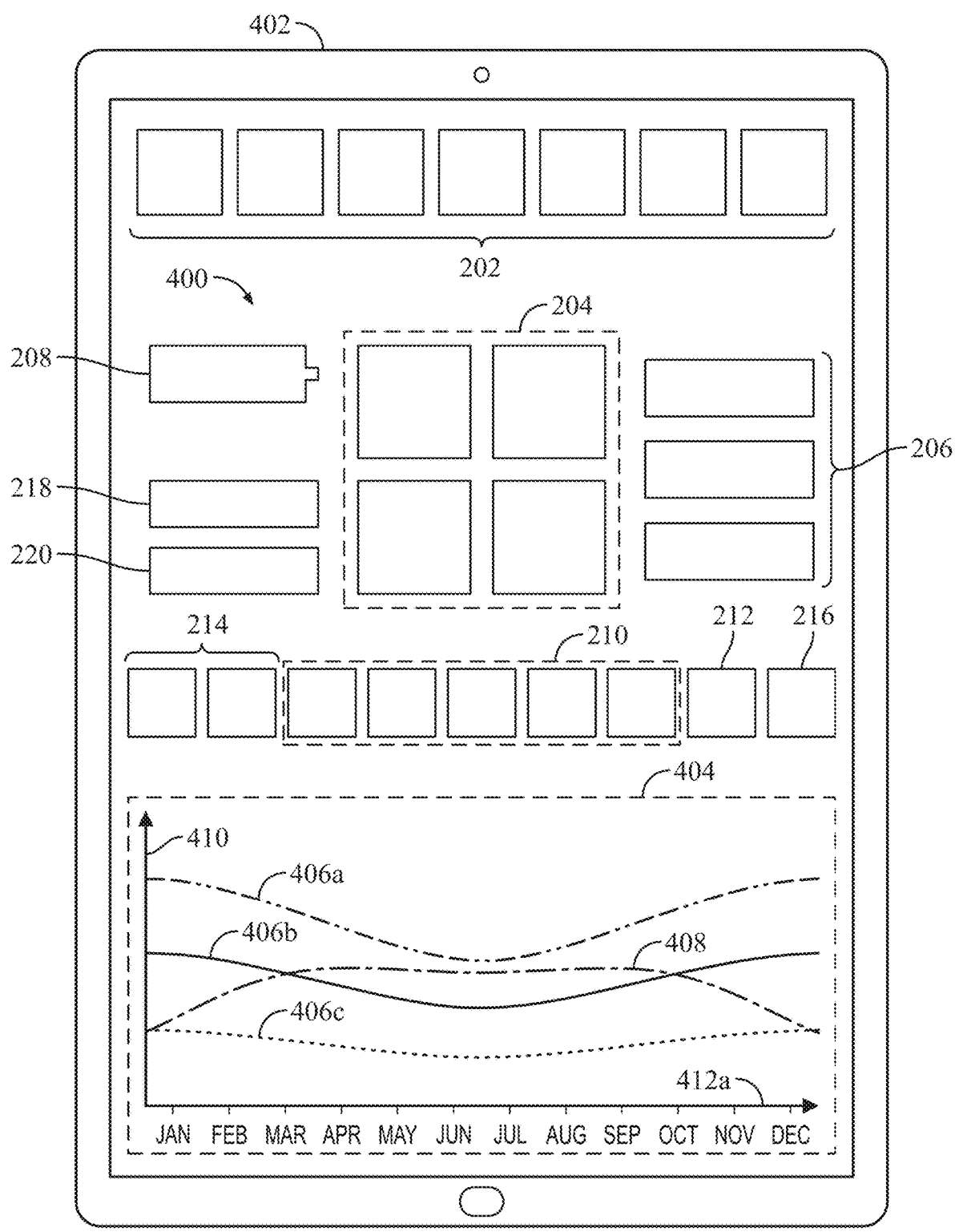
FIG. 4A is a diagram of the buttons and functions of the control panel displayed on a computer tablet screen.
Figure 4B:
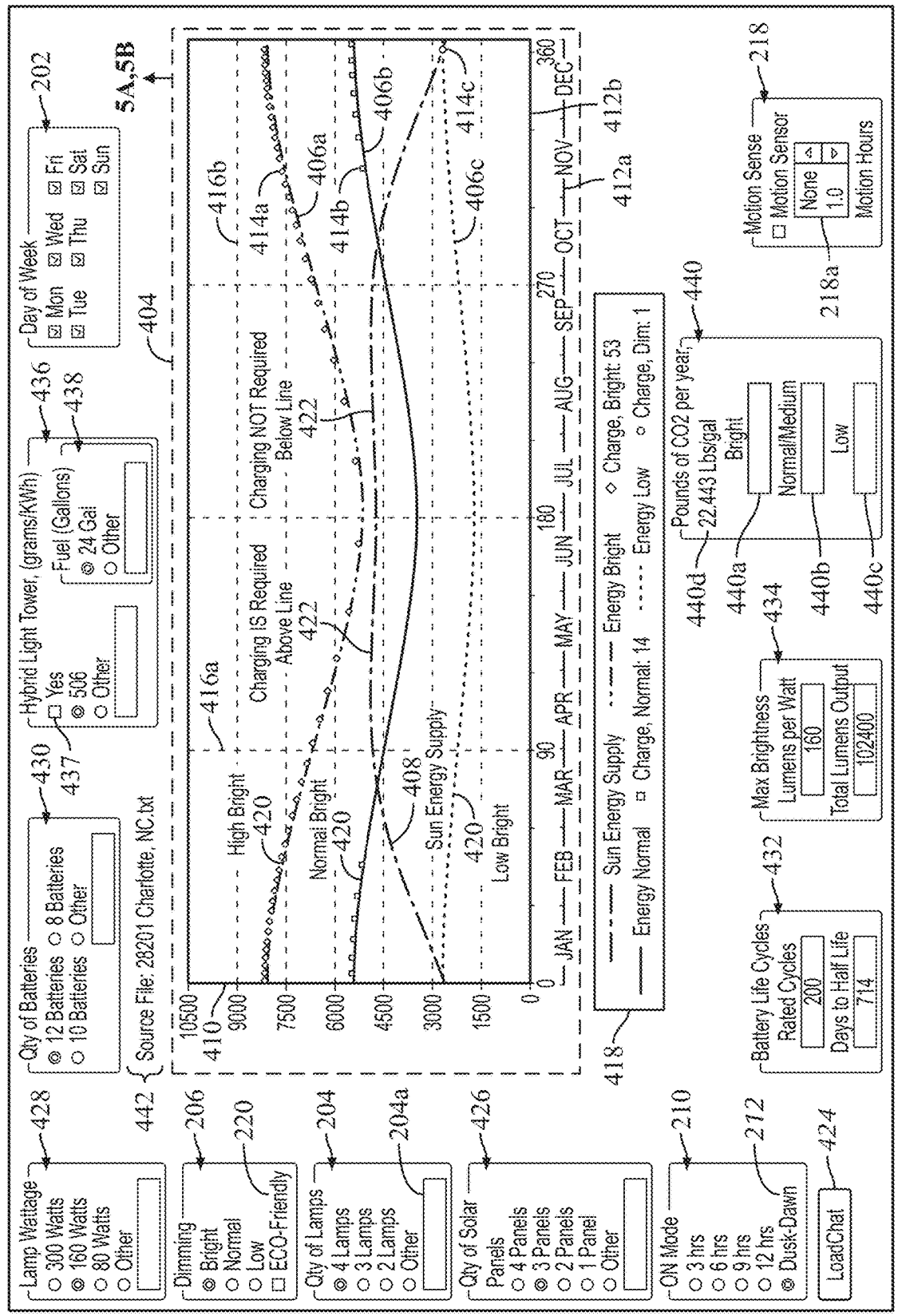
FIG. 4B is a diagram of another embodiment of a control panel displayed on a computer.
Figure 5A:
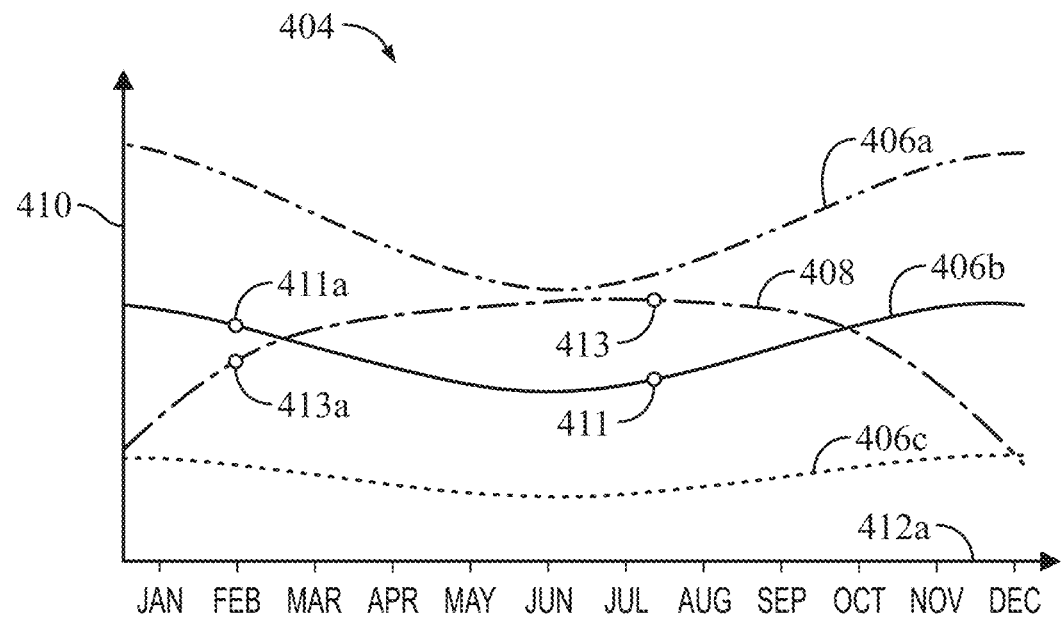
FIG. 5A is a diagram of an energy management graph displayed on the computer at a first configuration.
Figure 5B:
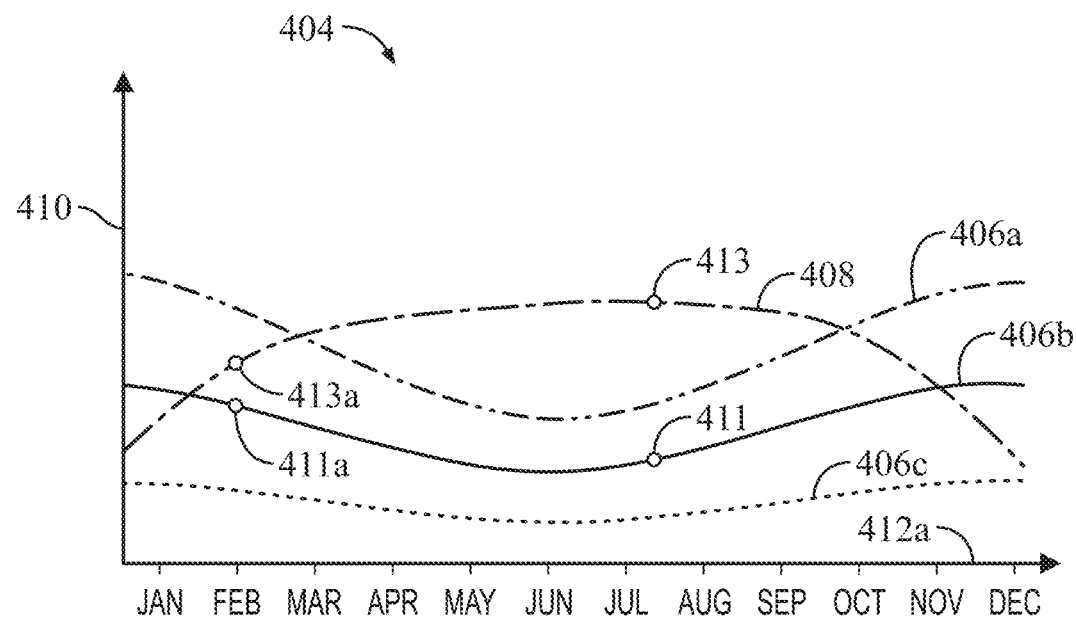
FIG. 5B is a diagram of an energy management graph displayed on the computer at a second configuration.

Referring now to the drawings, an apparatus and method for the energy management of a portable solar lighting tower 100 operated at a project site, such as a construction zone, is shown in FIG. 1. The portable solar lighting tower 100 may have components such as solar panels 108*a-d*, rechargeable batteries 106, and a lighting fixture 102 to produce lighting during the night using environmentally friendly energy, such as solar energy. Since the rechargeable batteries 106 may not be able to store enough energy for the operation of the lighting tower at full brightness throughout the night, the portable solar lighting tower may have different modes and functions to adjust the energy and power demanded of the lighting tower. Such modes and functions may be activated using the control panel 200 shown in FIG. 2. For instance, the control panel 200 may have a brightness adjustment 206 and lamp control 204 buttons (i.e., switches) for selectively turning on and off particular lamps 104*a-d*. A digital control panel 400 having the same or similar functions may be displayed on a computer 402, as shown in FIGS. 4A and 4B. Additionally, the control panel 400 displayed on the computer 402 may also display an energy management graph 404 that allows the user to decide whether the supply of solar energy, represented by curve 408, meets the energy demanded by the lighting tower, represented by one or more of curves 406*a-c*. As shown in FIGS. 5A and 5B, the energy management graph 404 may adapt and update to new data received about the energy demand and the energy supply.

More particularly, referring now to FIG. 1, a perspective view of a portable solar lighting tower 100 is shown. The main components of the portable solar lighting tower 100 may include the lighting fixture 102, rechargeable batteries 106 stored in a housing, solar panels 108a-d and a control panel 200 (shown in FIG. 2) stored inside a controller box 110 that controls the energy management of the solar lighting tower 100. The control panel 200 is designed to be user-friendly to help the user select the desired configuration and brightness of the solar lighting tower 100.

The lighting fixture 102 may comprise a plurality of lamps 104a-d. The number of lamps may range from two to 36 lamps. By way of example and not limitation, the lighting fixture 102 may have four lamps 104a-d that may be turned on and off independent from each other. By way of example and not limitation, the plurality of lamps 104a-d may be LED lights, specifically heavy-duty LED lights with ultra-high intensity. The lighting fixture 102 may be connected to one or more rechargeable batteries 106 stored inside a housing of the solar lighting tower 100. The number of rechargeable batteries may range from one to 24 batteries. The rechargeable batteries 106 are designed to power the lighting fixture 102 during the evenings. By way of example and not limitation, the one or more rechargeable batteries 106 may store enough electricity to power the lighting fixtures for one or more nights, such as one to seven nights.

The rechargeable batteries 106 may be connected and recharged by one or more solar panels 108a-d. The number of solar panels may range from one to twelve solar panels. The solar panels 108a-d may convert the solar energy radiated by the sun during the day into electrical energy, which the rechargeable batteries 106 store such energy. The solar panels 108a-d may hang above the rechargeable batteries 106 and below the lamps 104a-d and be adjusted at different angles and orientations relative to the sun to maximize the harvesting of solar light during the day. For example, the solar panels 108a-d may be tilted up and down about the first pivot axis 111 by extending or retracting the first telescoping arm 113. The solar lighting tower 100 may be rotated to direct the solar panels 108a, b, b, c in the direction of the sun. The lighting fixture 102 can be rotated about the second pivot axis 115. The lighting fixture 102 may also be raised and lowered by the second telescoping arm 117. The solar panels 108a-d may be retractable when not used, such as during the evenings or when the solar lighting tower is not on a job site. The operation of the solar panels 108a-d, rechargeable batteries 106, and specifically the lighting fixture 102 may be controlled by the control panel 200 stored in the controller box 110. By way of example and not limitation, the controller box 110 may have a locking mechanism, such as a combination lock, to prevent unwanted usage of the portable solar lighting tower 100.

Figure 2:
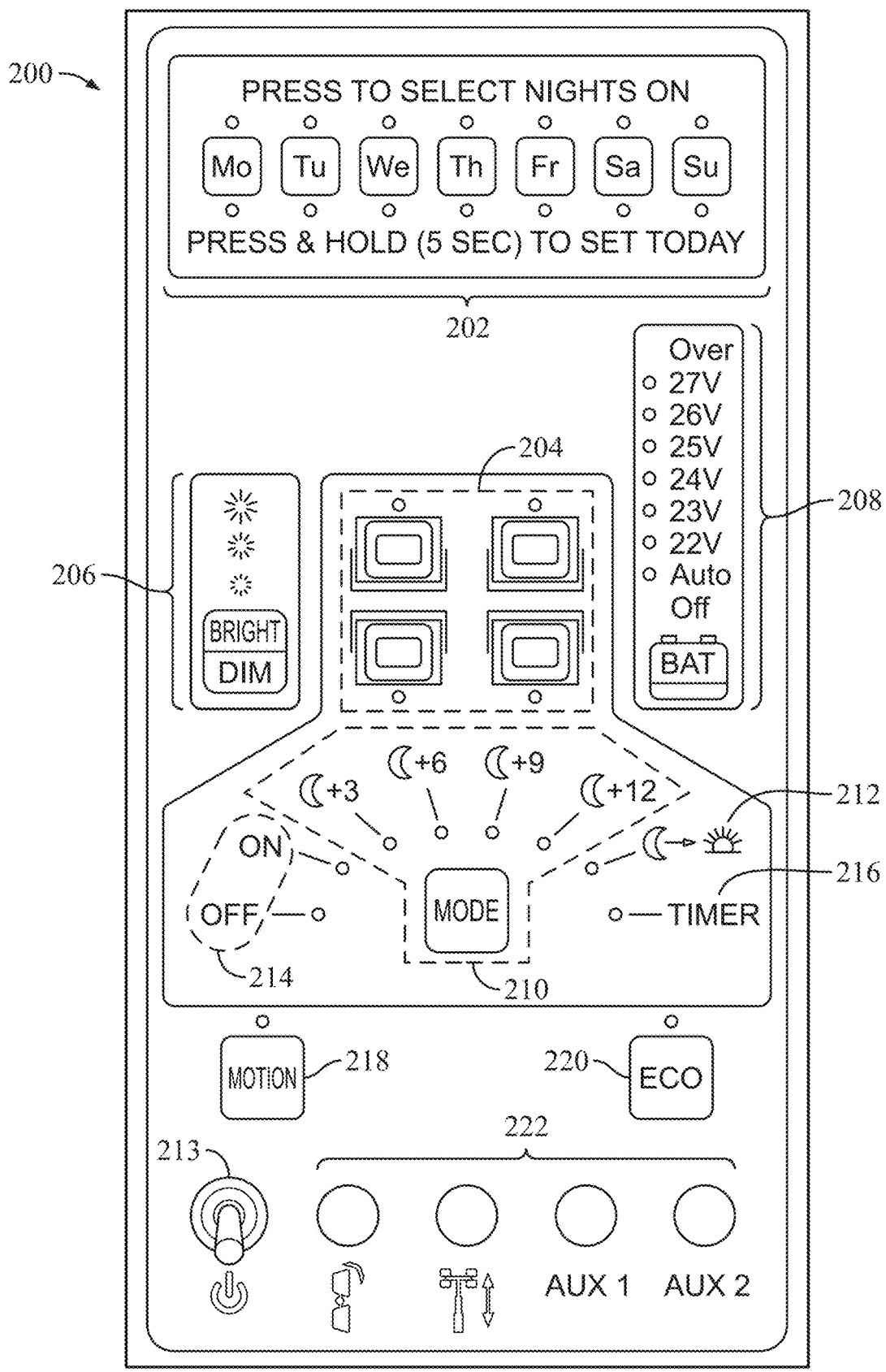
FIG. 2 is a front view of a control panel that controls the energy management of the solar lighting tower.

Referring now to FIG. 2, a front view of a control panel 200 that controls the energy/power management of the solar lighting tower 100 is shown. The configuration shown in FIG. 2 makes managing the power output and controlling the brightness of the lamps 104a-d shown in FIG. 1 easy, intuitive, and user-friendly. The control panel 200 has multiple power settings and allows the user to select a brightness of the lighting fixture 102 (shown in FIG. 1) when the light is turned on at night in a way that would allow the prolonging of stored power in the rechargeable batteries 106. A user may adjust the brightness and use a combination of features and functions available on the control panel 200 all in one place and without needing to reference a training manual. The modes, features, and functions of the control panel 200 described elsewhere herein may be in the form of pushable buttons.

The electric power transmitted to the control panel 200 may be switched on or off by the power switch 213. When the power switch 213 is turned on, the batteries 106 (shown in FIG. 1) power the solar lighting tower 100. The control panel 200 may also have on and off buttons 214 for the lighting fixture 102 (shown in FIG. 1). The control panel 200 may have lamp control buttons 204 that allow for the individual activation and deactivation of each lamp 104a-d (shown in FIG. 1) of the lighting fixture 102. The lamp control buttons 204 may have specific buttons designated to each of the lamps 104a-d. In this way, only certain lamps 104a-d can be turned on to lower the power demand of the lighting fixture 102. By way of example and not limitation, the upper two lamps 104a, b may only be turned on by the lamp control buttons 204 to lower the power demand. However, it is contemplated that any other combination of lamps 104a-d may be turned on or off. By way of example and not limitation, the lamp control buttons 204 may alternatively activate lamps 104c, d, or lamps 104a, c. The lamp control buttons 204 may be used in combination with other buttons and features mentioned elsewhere herein.

The control panel 200 may adjust the brightness of the lamps 104a-d of the lighting fixture 102 (shown in FIG. 1) when they 104a-d are activated. The control panel 200 may have brightness adjustment buttons 206 that provide a variety of brightness options for the user to select from. The change in brightness is possible since the lamps 104a-d of the lighting fixture 102 may be LED lights. By way of example and not limitation, the brightness adjustment buttons 206 may provide a high, intermediate, and low brightness options. The high brightness button may allow the lamps 104a-d to output power in the range of 161 and 320 Watts. The intermediate brightness button may allow the lamps 104a-d to output power in the range of 81 and 160 Watts. The low brightness button may allow the lamps 104a-d to output power in the range of 20 to 80 Watts. The brightness adjustment buttons 206 may be divided into additional gradations or degrees other than that described above. The brightness may be divided into 10 degrees of brightness. The brightness adjustment buttons 206 may be used in combination with other buttons and features mentioned elsewhere herein.

The control panel 200 may allow the user to schedule which days of the week the lamps of the lighting fixture 102 should automatically turn on around sunset. The control panel 200 may have seven buttons 202 for each day in the weekday and weekend where the user may select the evenings the lighting fixture 102 should be activated. The weekday and weekend buttons 202 may be used in combination with other buttons and features mentioned elsewhere herein. For example, when the user selects a medium brightness button 206, Wednesday button 202, the lamp selection 204a, b, then the solar lighting tower 100 will turn on lamps 104a, b but not lamps 204c, d on Wednesday at a medium brightness level.

The control panel 200 may allow the user to select how long after sunset the lighting fixture 102 (shown in FIG. 1) should stay on. This is controlled by the time increment buttons 210. When one of the time increment buttons is depressed, the lamps 104a-d will turn on at sunset and will remain on for such time increment after sunset, and then turn off. By way of example and not limitation, the time increment buttons 210 may be operative to keep the lamps 104a-d on for 3 hours, 6 hours, 9 hours or 12 hours. For example, one of the time increment buttons 210 may be set to activate and keep the lighting fixture 102 on for three hours after sunset, and another time increment button 210 may be set to activate and keep the lighting fixture 102 on for six hours after sunset. The rest of the time increment buttons 210 may increase by additional three hours all the way up to 12 hours.

It is also contemplated that other time incrementations may be used, such as 30 minute time increments, 1 hour time increments, two-hour time incrementation, six-hour time incrementation, etc. By way of example and not limitation, the user may alternatively manually input the specific amount of time that the lighting fixture 102 should turn off instead of choosing one of the time increment buttons 210. This may be accomplished by adding a keypad and monitor. The control panel 200 may also have an all-night button 212 where, when selected, the lighting fixture 102 would stay on for the whole night and automatically turn off approximately 15 minutes before sunrise, at sunrise, or approximately 15 minutes after sunrise.

In another example, the time increment buttons 210 may determine how long after sunset the lighting fixture 102 should activate instead of deactivating. For example, the time increment buttons 210 may be set, so that when selected, to turn on the lighting fixture 102 after a specific time has passed from sunset. There may exists both time increment buttons for when the lighting fixture should turn on after sunset and also for the length of time the lighting fixture should stay on after sunset to give the user additional options. The time increment buttons 210 may be used in combination with other buttons and features mentioned elsewhere herein. For example, when the user selects a medium brightness button 206, Wednesday button 202, the lamp selection 204a, b, and the +3 button 210, then the solar lighting tower 100 will turn on lamps 104a, b but not lamps 104c, d on Wednesday at a medium brightness level and active for three hours after sunset.

The control panel 200 may have an input 216 to connect an external timer to control the lighting fixture 102. The external timer input 216 may override the weekday and weekend buttons 202, the time increment buttons 210, and the on and off buttons 214 to provide a more advanced and customizable timing mechanism for when the lighting fixture 102 should be turned on or off. By way of example and not limitation, the external timer connected to the input 216 may override the time increment buttons 210 only. The weekday and weekend buttons 202 may still be used in conjunction with the external timer connected to the input 216. The external timer connected to the input 216 may be used in combination with other buttons and features mentioned elsewhere herein.

The control panel 200 may have an eco-mode 220 to further reduce the energy consumption of the lighting fixture 102 and maintain a longer battery life of the device. The eco-mode button 220 may reduce the brightness of the lighting fixture 102 by a fraction of the brightness initially selected. By way of example and not limitation, the eco-mode button 220 may reduce the brightness produced by the lighting fixture 102 by one-half. Other contemplated fractional reduction may include reducing the brightness within a range of two-thirds and one-third of the initial brightness. The eco-mode button 220 may automatically reduce the brightness of the lighting fixture 102 after a certain number of hours have passed in the evening. By way of example and not limitation, the eco-mode 220 may automatically reduce the brightness of the lighting fixture 102 after six hours have passed. Other contemplated time durations for automatic reduction of the brightness include a time within two to ten hours. The eco-mode button 220 may reduce the brightness of the lighting fixtures 102 and function independent from the time increment buttons 210. For example, when the eco-mode button 220 is depressed, the brightness is reduced from the current brightness setting set by the brightness button 206. The eco-mode 220 button may be used in combination with other buttons and features mentioned elsewhere herein.

The control panel 200 may have a motion mode 218 to dim the light of the lighting fixture 102 when no motion is detected near the portable solar lighting tower 100 (shown in FIG. 1). A motion sensor may be located on or near the portable solar lighting tower 100 so that after a certain amount of time has passed without detection of motion or movement near the lighting tower, the lights of the lighting fixture 102 automatically dims. By way of example and not limitation, the motion mode button 218 may reduce the initially selected brightness of the lighting fixture 102 by a fraction, which can range within three quarters to one-fifth of the selected brightness, and more preferably between one half and one fifth of the selected brightness. Alternatively, the motion mode 218 may completely turn off the light of the lighting fixture 102 when no motion is detected near the portable solar lighting tower 100 instead of dimming the light. By way of example and not limitation, the motion mode 218 may automatically dim or turn off the lights of the lighting fixture 102 after the passage of a time. Such passage of time may range within 1 minute to three hours.

The motion mode button 218 may work in conjunction with other buttons and modes. By way of example and not limitation, the motion mode button 218 may be used with the eco-mode button 220. When these two features are both activated, then the motion mode 218 would further reduce the brightness of the lights in addition to what the eco-mode reduces the brightness. By way of example and not limitation, if the eco-mode reduces the initially selected brightness by one-half, the motion mode would reduce such reduction to a lower fraction when motion in not detected near the portable solar lighting tower 100. So, if the motion mode 218 is designed to reduce brightness by one-third, the brightness would reduce to one-third of the eco-mode brightness. The motion mode button 218 may be used in combination with other buttons and features mentioned elsewhere herein.

The control panel 200 may have a battery status indicator 208 that displays in real-time the status of the rechargeable batteries. For instance, the battery status indicator 208 may display the battery voltage that the rechargeable batteries 106 (shown in FIG. 1) currently have. The battery status indicator 208 may have a display that show the reduction of the battery voltage by increments or alternatively display the numerical amount of the battery voltage. By way of example and not limitation, the incremental display of the battery status indicator 208 may start from 27 volts and reduce by increments of four, three, two or one volts. The battery status indicator 208 helps determine whether the user should recharge the rechargeable batteries 106 or alternatively change the settings and brightness of the lighting fixture 102.

The control panel 200 may have pre-drilled holes 222 to integrate additional functions to either further control the lighting fixture 102 or the other components of the solar lighting tower 100 (shown FIG. 1), such as the solar panels 108a-d or the rechargeable batteries 106. By way of example and not limitation, the control panel 200 may have four to six pre-drilled holes 222 located at the bottom region of the control panel 200. By way of example and not limitation, the pre-drilled holes 222 may be used to add the function of electromechanically tilting the solar panels 108a-d (shown in FIG. 1) up and down about the first pivot axis 111 instead of manually using a first telescoping arm 113. By way of example and not limitation, the pre-drilled holes 222 may be used to add the function of electromechanically adjusting the second telescoping arm 117 to raise or lower the lighting fixture 102 or to turn the lighting fixture 102 about the second pivot axis 115. Other additional modes and functions discussed herein, specifically with FIG. 4B, may also be integrated in the control panel 200 using the pre-drilled holes 222.

Figure 3:
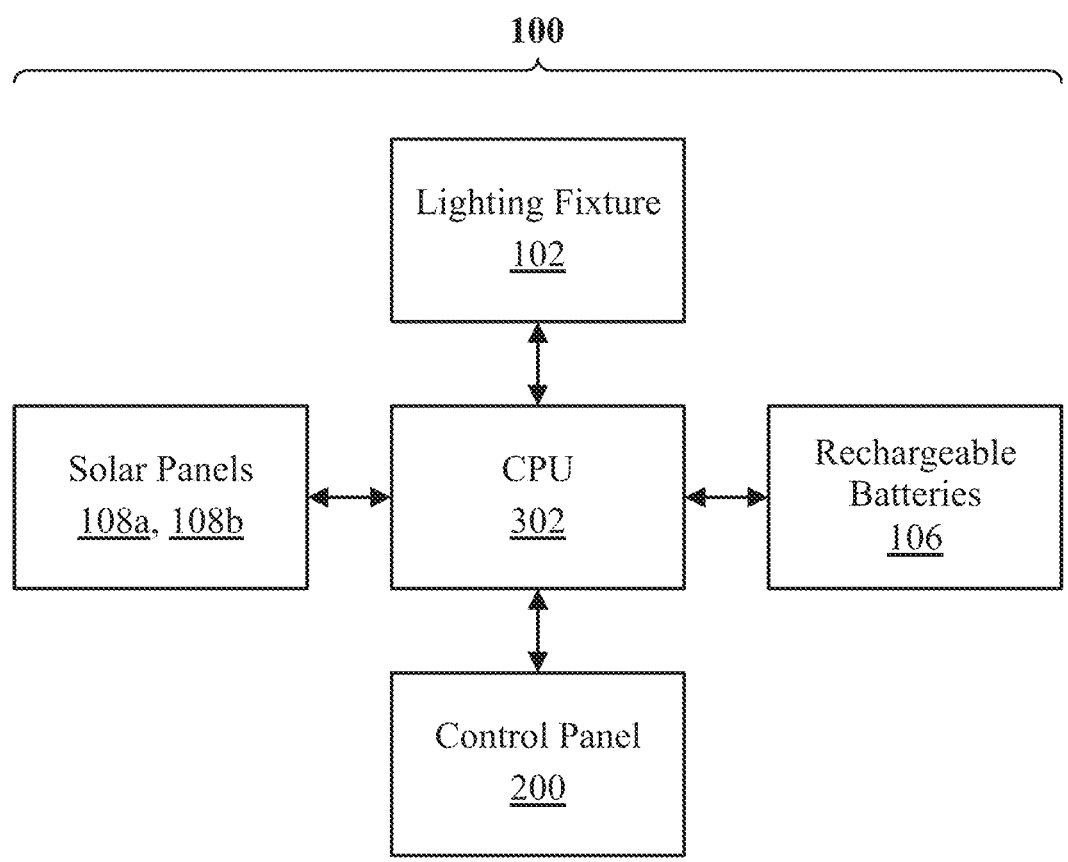
FIG. 3 is a block diagram of the relations between the different components of the solar lighting tower.

Referring now to FIG. 3, a block diagram of the relation between the different components of the solar lighting tower 100 is shown. Mainly, a central processing unit 302 may execute commands and control the different components needed for the functioning of the portable solar lighting tower 100. If necessary, additional processing units may also be used for the functioning of the portable solar lighting tower 100. The central processing unit 302 may be integrated or be separate from the control panel 200 shown in FIG. 2.

With further reference to FIG. 2 and FIG. 3, the processor 302 may execute the different features, modes, and functions described elsewhere herein and laid out as buttons on the control panel 200 to control the lighting fixture 102 shown in FIG. 1. For example, the processor 302 may execute the on and off command 214 to activate and deactivate the solar lighting tower 100 and also execute the selection of which specific LED lamps to be turned on via the lamp control buttons 204. The processor 302 may additionally execute the brightness adjustment buttons 206 that selects different brightness levels of the lighting fixture 102.

Still with reference to FIGS. 2 and 3, the processor 302 may execute the different illumination timing features outlined on the control panel 200. The processor 302 may execute the weekday and weekend buttons 202, the time increment buttons 210, the all-night button 212, and the commands received from the external timer input 216, which all of such features may be laid out as buttons or inputs on the control panel 200. The processor 302 may also execute the eco-mode 220 and motion mode 218 button outlined on the control panel 200. The processor 302 may executed a combination of the features mentioned herein and laid out on the control panel 200. The processor 302 may also receive information from the rechargeable batteries 106 about the amount of electricity and voltage the batteries have available to display such information on the battery status indicator 208 of the control panel 200. The additional features that may be integrated to the control panel 200 through the pre-drilled holes 222 may also be executed by the processor 302.

Referring now to FIG. 4A, a diagram of the features and buttons of the control panel 200 displayed on a computer tablet 402 is shown. The features and buttons of the control panel 200 may be accessed through an application software installed on the computer table 402 that generates a digital control panel 400. The processor 302 or control panel 200 may be connected to the computer tablet 402 through a WIFI or Bluetooth connection. As a result, the portable solar lighting tower may have one or more wireless antennae for receiving and sending data to and from the computer tablet 402 that is configured to activate and deactivate the functions of the lighting tower represented by the buttons on the control panel.

The same or similar features that can be executed using the control panel 200 may be executed through the digital control panel 400 using the application software installed on the computer tablet 402. Such features and commands include, but not limited to, the on and off buttons 214, the lamp control buttons 204, the brightness adjustment buttons 206, the weekday and weekend timing buttons 202, the time increment buttons 210, the all-night button 212, the external timer input 216, the eco-mode 220, the motion mode 218, and also checking the battery status indicator 208. Such features accessed and controlled via the computer tablet 402 may have the same functions as described elsewhere herein. The modes, features, and functions of the control panel 200 may also be displayed on a smartphone or other computer devices and is not exclusive to a computer tablet 402. Additionally, the digital control panel 400 may display an energy management graph 404 for managing the power output of the portable solar lighting tower. Such graph will be discussed in detail elsewhere herein.

Referring now to FIG. 4B, a diagram of another embodiment of a digital control panel 400 displayed on a computer that has more selection features and functions than FIG. 4A is shown. Similar to FIG. 4A, the digital control panel 400 of FIG. 4B may execute similar features and commands as the control panel 200 shown in FIG. 2. Such features and commands include, but not limited to, the weekday and weekend timing buttons 202, the lamp control buttons 204, the brightness adjustment buttons 206, the time increment buttons 210, the all-night button 212, the motion mode 218, and the eco-mode 220. Such features accessed and controlled via the control panel 400 on the computer may have the same functions as described elsewhere herein. The control panel 400 displayed on FIG. 4B may also be displayed on different types of computers including, but not limited to, a desktop, laptop, tablet, or a smartphone.

By way of example and not limitation, the lamp control buttons 204 shown in FIG. 4B may control the number of lamps that activate on the portable solar lighting tower. The lamp control buttons 204 may provide the option to activate and deactivate between one to four lamps. Additionally, a lamp input 204a may be displayed on the control panel where a user may input a desired numbered of lamps to be activated. As a result, if the solar lighting tower has more than four lamps, for instance a half-dozen to three-dozen lamps, then the user may manually input how many lamps should activate by entering the quantity of lamps in the lamp input section 204a.

The digital control panel 400 of FIG. 4B may also provide more customizable options for the motion mode 218 feature. By way of example and not limitation, the digital control panel 400 may have a motion time input 218a where a user may input a specific amount of time for the lights to dim or deactivate in the absence of motion around the portable solar lighting tower. By way of example and not limitation, the motion time input 218a may allow a user to input the desired time in hours with one or two decimal places to account for the minutes. As a result, the user may input time for the motion mode 218 in hours, fraction of an hour, or a combination thereof.

In addition, or in the alternative, of choosing the brightness level of the LED lamps using the "low," "normal," and "bright" buttons 206 of the digital control panel 400, a user may select the specific amount of wattage that the lamps should emit light by using the wattage adjustment buttons 428. A user may select from a predetermined amount of wattage that is displayed on the control panel 400 or manually input a wattage level using the wattage adjustment buttons 428. By way of example and not limitation, the predetermined wattage amounts displayed may range from 20 to 80 Watts for a low range, 81 to 160 Watts for a medium range, and 161 to 320 Watts for a high range. By way of example and not limitation, a user may manually input a wattage level for the LED lamps within a range of 10 to 330 Watts.

The digital control panel 400 of FIG. 4B may also provide an option for the user to select how many solar panels should be used during the day to harvest solar energy for the portable solar lighting tower. The control panel 400 may have solar panel selection buttons 426 where a user may select from a predetermined number of solar panels or manually input the number of solar panels to harvest solar energy. As a result, the solar panel selection buttons 426 may control the solar panels 108*a-d* shown in FIG. 1. By way of example and not limitation, the predetermined number of solar panels to be selected may range from one to four solar panels. The user may also manually input the number of solar panels to be used, especially if more than four solar panels are connected to the solar lighting tower and needed to harvest solar energy. Such manual entry may range between one to 12 solar panels.

The digital control panel 400 of FIG. 4B may furthermore provide an option for the user to select how many batteries of the portable solar lighting tower should be used in providing power for lighting. Alternatively, the control panel 400 may provide the option for the user to select how many batteries should recharge during the day by the solar panels. The control panel 400 may also provide both aforementioned features and functions pertaining to the rechargeable batteries. As a result, the control panel 400 may have battery selection buttons 430 where a user may select from a predetermined number of batteries or manually input the number of batteries to be used in recharging and/or for powering the lighting system. As a result, the battery selection buttons 430 may control the batteries 106 shown in FIG. 1. By way of example and not limitation, the predetermined number of batteries to be selected may range from one to 16 batteries, where the predetermined battery quantities are increased from one to four and furthermore by additional increments of four. By way of example and not limitation, the predetermined number of batteries shown on the control panel 400 may be eight, 10, and 12 batteries. The user may also manually input the number of batteries to be used. Such manual entry may range between one to 16 rechargeable batteries.

As seen in FIG. 4B, the digital control panel 400 may also display statistics about the battery life cycle 432 and the maximum brightness 434 of the portable solar lighting tower. Such information may allow the user to update or modify the lighting tower to meet the necessary requirements of the needed lighting at the project site. Referring now to the battery life cycle 432 statistics, the control panel 400 may display the number of times the rechargeable batteries have been discharged and recharged, as categorized by Rated Cycles. Additionally, the battery life cycle 432 may provide information about the amount of time the rechargeable batteries would reach their half-life. Displaying the half-life provides the amount of time it takes for the rechargeable batteries to reach half of their maximum charging capacity. Such amount of time may be displayed and quantified by days, weeks, months, or a combination thereof. Referring now to the maximum brightness statistics 434, the control panel 400 may display information about the maximum brightness output that the portable solar lighting tower may emit. The brightness statistics 434 may display the total lumen output of the lighting tower, which defines how much total visible light can be emitted by the lighting tower. The brightness statistics 434 may also provide information about the energy efficiency of the lighting tower in the form of the lumens per Watt. The lumens per Watt information provide how much visible light the lighting tower emits for a given amount of electricity.

The digital control panel 400 of FIG. 4B may also be configured to control a hybrid portable solar lighting tower that uses both solar energy and combustion fuel to emit light at the project site. As a result, the control panel 400 may display $CO_2$ production statistics 440 and adjust the energy management graph 404 according to the additional source of energy (i.e. combustion fuel). The hybrid portable solar lighting tower may have the same or similar modes and features described elsewhere herein, which include the modes and features shown in FIG. 4B. The adjustment of the energy management graph 404 based on using a hybrid lighting system will be discussed elsewhere herein.

To display the $CO_2$ production statistics 440, the user may have to first indicate that a hybrid lighting tower is being used by selecting the box 437. Second, the user may input the fuel volume 438 and the fuel efficiency 436 of the hybrid lighting tower on the control panel 400. The user may select from a predetermined amount of fuel volume or manually input the fuel amount in the fuel volume selection 438. By way of example and not limitation, the fuel volume selection 438 may be measured in gallons or liters, and the predetermined selection amount may be 6, 12, 18, 24, or 36 gallons or a plurality of such selections. The fuel efficiency selection 436 may be measured by specific fuel consumption where a user may select from a predetermined fuel efficiency amount or manually input such information. By way of example and not limitation, the specific fuel consumption may be measured in grams per kilo-Watt-hour and there may exist one or more predetermined fuel efficiency values for selection, such as the value of 506 grams per k Wh.

When the fuel volume 438 and the fuel efficiency 436 are inputted in the control panel, then the $CO_2$ production statistics 440 may be calculated and displayed. The $CO_2$ production statistics 440 may be produced in terms of the mass of the $CO_2$ produced by the hybrid lighting tower. By way of example and not limitation, the $CO_2$ statistics 440 may display the amount of $CO_2$ mass produced per year based on the information inputted in the control panel. The $CO_2$ production statistics 440 may also depend on other modes and features that pertain to the solar power of the lighting system, which is selected on the control panel 400. Such modes and features may be the ones shown in FIG. 4B and discussed elsewhere herein. By way of example and not limitation, three different $CO_2$ production statistics 440 may be displayed on the control panel, one for each level of brightness that the portable hybrid lighting tower can operate under. The three $CO_2$ values 440*a, b, c* may correspond to the low, medium, and high brightness settings corresponding to the brightness adjustment 206 feature on the control panel 400. The $CO_2$ production statistics 440 may also display the density of $CO_2$ gas 440*d* for the user to reference.

The digital control panel 400 may also control the movement of the different components of the portable solar lighting tower 100 shown in FIG. 1. The control panel 400 may have functions and features to electromechanically tilt the solar panels 108*a-d* (shown in FIG. 1) up and down about the first pivot axis 111. The control panel 400 may also be used to add the function of electromechanically adjusting the second telescoping arm 117 to raise or lower the lighting fixture 102 or to turn the lighting fixture 102 about the second pivot axis 115.

As shown in FIGS. 4A and 4B, and in specific details in FIGS. 5A and 5B, the control panel displayed on the computer may also display an energy management graph 404. The energy management graph 404 may provide a user-friendly tool to help the user choose and plan the amount of energy the portable solar lighting tower 100 should use based on the available amount of solar energy. Based on the information provided by the energy management graph 404, the user may adjust the energy demanded by the lighting tower to not exceed the available solar energy that can be harvested by the solar panels 108*a-d* (shown in FIG. 1) during a certain period of time. Accordingly, the user may adjust the power and brightness settings (i.e., motion mode, eco mode, lamps, brightness buttons) discussed elsewhere herein to maintain the needed lighting at the project site while not exceeding the available solar energy. Alternatively, the user may bring additional rechargeable batteries to meet the required power and brightness settings for the project where changing the settings to meet the supply of energy is not viable.

The energy management graph 404 may be in the form of an energy versus time graph, where the energy variable may be represented on the vertical axis 410 and the time variable may be represented on the horizontal axis 412*a*. The energy variable may be measured in any viable measuring unit including, but not limited to, joules, kilojoules, Watt-hour, or kilo-Watt-hour. The time variable may be measured in any viable measuring units including, but not limited to, months, weeks, days, hours, or minutes. Alternatively, the energy management graph 404 may be in the form of a power versus time graph, where the power variable may be represented on the vertical axis 410 and the time variable may be represented on the horizontal axis 412*a*. The power variable may be measured in any viable measuring unit including, but not limited to, Watts or kilo-Watts. The time variable may be measured similar to the energy versus time graph mentioned herein. By way of example and not limitation, the horizontal axis 412*a* defining the time variable may span over a full year since different variables that determine the available solar energy are likely to remain constant from year to year, such as the different seasonal changes. Other time span ranges on the horizontal axis, such as months, weeks, days, hours, or minutes, are also contemplated.

The energy management graph 404 may have one or more demand curves 406*a-c* representing the power or energy demanded by the portable solar lighting tower 100 (shown FIG. 1) at different modes and configurations. As discussed further with FIGS. 5A and 5B, the one or more demand curves 406*a-c* may change shape and adjust according to the type of modes and brightness settings that are selected for the portable solar lighting tower 100 described elsewhere herein. The modes and features that define the one or more demand curves 406*a-c* may be the ones displayed on the two different embodiments of a control panel shown in FIGS. 4A and 4B.

The energy management graph 404 may also have a supply curve 408 representing the solar power or energy available for the charging of the rechargeable batteries 106 (shown in FIG. 1) of the portable solar lighting tower 100. The supply curve 408 may be defined by previously collected or real-time data of the weather and sunlight data of the location where the portable solar lighting tower 100 is located, which such location can be categorized by the postal zip code designated to the location. The supply curve 408 may span over a period of a year and may be a bell shape because in the United States, winter months have shorter sunny days whereas summer months have longer sunny days. The shape of the bell may be flatter if the solar lighting tower 100 is used in a location closer to the equator where the length of the day during summer and winter months do not have as significant of a time difference compared to locations further away from the equator. The supply curve 408 is also dependent on the weather patterns of the location. For example, since Southern California has significantly more sunny days compared to Washington state, the supply curve 408 will reflect such difference. As discussed further with FIGS. 5A and 5B, the supply curve 408 may change shape and adjust based on the zip code selected that represent where the portable solar lighting tower 100 is located. The user may enter the zip code where the solar lighting tower 100 is to be used or the solar lighting tower 100 may have a GPS unit that communicates with the computer tablet 402 shown in FIG. 4A, or any other external computer. The correct supply curve 408 may be shown based on the GPS coordinates provided by the on-board GPS unit.

By way of example and not limitation, the previously collected data representing the supply curve 408 may be averaged, processed, or data mined from multiple years and even decades to illustrate the supply curve 408. The different variables that may be taken into account for determining the amount of available solar energy/power at different locations include, but not limited to, the sunrise and sunset time (i.e., daylight hours) and the weather pattern, which includes how much cloud, rain, snow, sunshine, etc. the location receives. Such variables may be relatively constant year to year and, as a result, the time variable defined by the horizontal axis 412*a* of the energy management graph 404 may span over a length of a full year.

Referring specifically to FIG. 4B, a more advanced energy management graph 404 than the one in FIG. 4A is shown. The vertical axis 410 of the graph 404 may represent the power or energy variable and the horizontal axis 412*a* may represent the time variable as discussed elsewhere herein. By way of example and not limitation, the vertical axis 410 may represent the energy variable and the horizontal axis 412*a* may represent time spanning over one year. The vertical axis 410 may range in energy values between 0 Watt-hour to 10.5 kilo-Watt-hour. Alternatively, the vertical axis 410 may have a larger energy range spanning to 20 kWh or a smaller energy range having a maximum value of 5 kWh. The graph 404 may have two horizontal axes 412*a, b*, where the first horizontal axis 412*a* represents time measured in months and the second horizontal axis 412*b* represents time measured in days. The second horizontal axis 412*b* may have increment marks for every passed 30-days to match closely the monthly measurements of the first horizontal axis 412*a*.

The one or more energy demand curves 406*a-c* and the energy supply curve 408 of the graph 404 may be generated by selecting the load chart button 424 of the digital control panel 400. The load chart button 424 may also generate an updated energy management graph 404 that displays new demand curves 406*a-c* representing the new modes and features selected on the control panel 400 and a supply curve 408 representing a new location. The location indicator 442 may display information about the location that corresponds to the energy supply curve 408. Such information may include the city, state, and zip code of the location that the supply curve 408 represents the available amount of solar energy. By way of example and not limitation, the energy data making up the supply curve 408 may be derived from weather and daylight data collected from previous years that may be averaged, processed, or data mined to represent an estimate of the projected available amount of solar energy/power. The usage of real-time data to produce the supply curve 408 is also contemplated. As mentioned elsewhere herein, the timespan of one year outlined on the horizontal axis 412 may be important since the sunrise and sunset time and weather cycles are likely to repeat after one year.

The one or more energy demand curves 406a-c may each correspond to the different brightness options available on the portable solar lighting tower that are selectable by the brightness adjustment 206 buttons. The first demand curve 406a may correspond to the high brightness mode, the second demand curve 406b may correspond to the medium brightness mode, and the third demand curve 406c may correspond to the low brightness mode. Such modes are outlined on the brightness adjustment 206 feature and discussed elsewhere herein. The demand curves 406a-c may also change shape based on the user selecting other modes and features on the control panel 400.

By way of example and not limitation, each demand curve 406a-c may also have one or more charging frequency points 414a-c. The charging frequency points 414a-c may provide the user with an indication as to the points in time where the portable solar lighting tower needs to be recharged. The demand curve 406a corresponding to the high brightness setting may have more charging frequency points 414a compared to the medium or low brightness demand curves 406b, c. By way of example and not limitation, the charging frequency points 414a-c may specifically indicate the points in time where there may not exist enough solar energy to recharge the batteries to meet the energy demand, and the user may have to undertake an alternative option in charging the batteries of the portable solar lighting tower.

The energy management graph 404 of FIG. 4B may also have labels 420 that describe what each curve 406a-c and 408 in the graph represent. By way of example and not limitation, the first demand curve 406a may be labeled as "High Bright," the second demand curve 406b may be labeled as "Normal Bright," the third demand curve 406c may be labeled as "Low Bright," and the energy supply curve may be labeled as "Sun Energy Supply." Other synonymous words may also be used in the labels 420 to describe the different curves. The graph 404 may also have instruction boxes 422 that may point to the supply curve 408 that help the user interpret how to read the graph. As discussed elsewhere herein, the direction boxes 422 may describe that when a portion of an energy demand curve 406a-c is above the energy supply curve 408, that charging would be required. And the direction boxes 422 may also describe that when a portion of an energy demand curve 406a-c is below the energy supply curve 408, that charging is not necessarily required.

As shown in FIG. 4B, a graph legend 418 may also be displayed to help the user determine what each curve and points on the energy management graphs 404 represent. The one or more demand curves 406a-c and the supply curve 408 may be color-coded and the graph legend 418 may describe what each colored curve represent in the graph 404. The charging frequency points 414a, b may also be color-coded and the graph legend 418 may describe what each colored point represents in the graph 404. The graph legend 418 may also provide the total number of charging frequency points 414a, b on each energy demand curve 406a-c. Additionally, the graph 404 may also have vertical and horizontal grids 416a, b that help the user track desired points on the curves represented on the graph.

Referring now to FIGS. 5A and 5B, diagrams of the energy management graph 404 at a first and a second configuration is shown. FIG. 5A shows a first configuration of one or more demand curves 406a-c and a supply 408 curve, and FIG. 5B shows a second configuration where the one or more demand curves 406a-c are adjusted to a different setting. As explained elsewhere herein, each of the demand curves 406a-c may correspond to a different brightness adjustment setting 206 that the operator can select on the control panel 400 shown in FIGS. 4A and 4B. The first curve 406a may represent the high brightness, the second curve 406b may represent the medium brightness, and the third curve 506c may represent the low brightness setting. The demand curves 406a-c have an inverse shape compared to the supply curve 408. During the winter months in the United States, the days are shorter. As such, the energy demand for powering the lamps of the lighting tower throughout the entire night is greater than during the summer months. The demand curves 406a-c, which may represent the energy or power demanded by the portable solar lighting tower 100 of FIG. 1, may change shape by selecting a different mode or combination of modes available on the digital control panel 400 displayed by a computer and shown in FIGS. 4A and 4B, described elsewhere herein.

During use, the operator can use the graph 404 as follows. In general, if a portion of a demand curve 406a-c contacts or is under the energy supply curve 408, then during such portion of time there may exist enough solar energy to power the portable solar lighting tower at the selected modes and brightness level. Reversely, if a portion of the energy demand curve 406a-c is above the supply curve 408, then during such portion of time there may not be enough solar energy to power the portable solar lighting tower at the selected modes and brightness level. As a result, the user may want to change the settings of the portable solar lighting tower for the energy demand to align with the supply of solar energy during the daytime.

Referring now to FIG. 5A, if the month the tower 100 is being used is July, and a medium brightness level is selected that corresponds to the second demand curve 406b, the point 411 on the demand curve is lower than the point 413 on the supply curve 408. If the month the tower 100 is being used is February, and the same settings are selected, the point 411a on the demand curve is higher than the point 413a on the supply curve 408. Because of this, the operator needs to adjust one or more of the modes of the tower to adjust the power consumption of the tower 100 to be below the supply curve. The operator may reduce the number of lamps being turned on, the length of time that the lamps are turned on, the brightness of the lamps, motion mode and eco mode. Each time a setting is changed, the one or more demand curves 406a-c will move up, down, or change shape as dictated by the options the operator is turning on or off. In our example above, the demand curves 406a-c will move down as the operator reduces the number of lamps being turned on, reduces the length of time that the lamps are turned on, etc. As shown in FIG. 5B, the operator may want to select settings that transforms the second demand curve 406b downwards in the graph 404 so that the energy demanded in the month of February (point 411a) is below the solar energy supplied (point 413a) in such month.

The graphs of FIGS. 5A and 5B may be used and interpreted in determining whether the portable solar lighting tower 100 would have enough battery power to maintain illumination of light at the selected modes during the needed duration of time. By way of example and not limitation, when the point 411 on the demand curve 406 is below the point 413 on the supply curve 408, then the user may interpret that the solar lighting tower 100 can recharge its batteries 106 sufficiently during daytime to provide enough power to light up the work site during the night time. If, however, the point 411 on the demand curve 406 is above the point 413 on the supply curve, then the user may interpret that the solar lighting tower 100 cannot recharge the rechargeable batteries enough during the daytime to power the selected modes on the physical control panel or the digital control panel, and additional recharging or a change in the power consumption settings is required. For example, the operator may have to reduce the number of lamps turned on during the night or the length of operating time would have to be reduced so that some or all of the demand curves 406a-c move downward on the graph, as seen in FIG. 5B, which such transformation would indicate that less energy is needed to operate the lighting tower.

By way of example and not limitation, the demand curves 406a-c of the energy management graph 404 may also be transformed if a hybrid portable solar lighting tower is used instead of a lighting tower that only used solar energy. Referring to FIG. 4B, a user may select box 437 indicating that a hybrid lighting tower is being used, enter or select the fuel efficiency value 436 and fuel volume 438, and press the load chart 424 button. Such selection may transform the demand curves 406a-c downwards since there would be less need for solar energy because the lighting tower also uses combustion fuel to power the lights.

Figure 6:
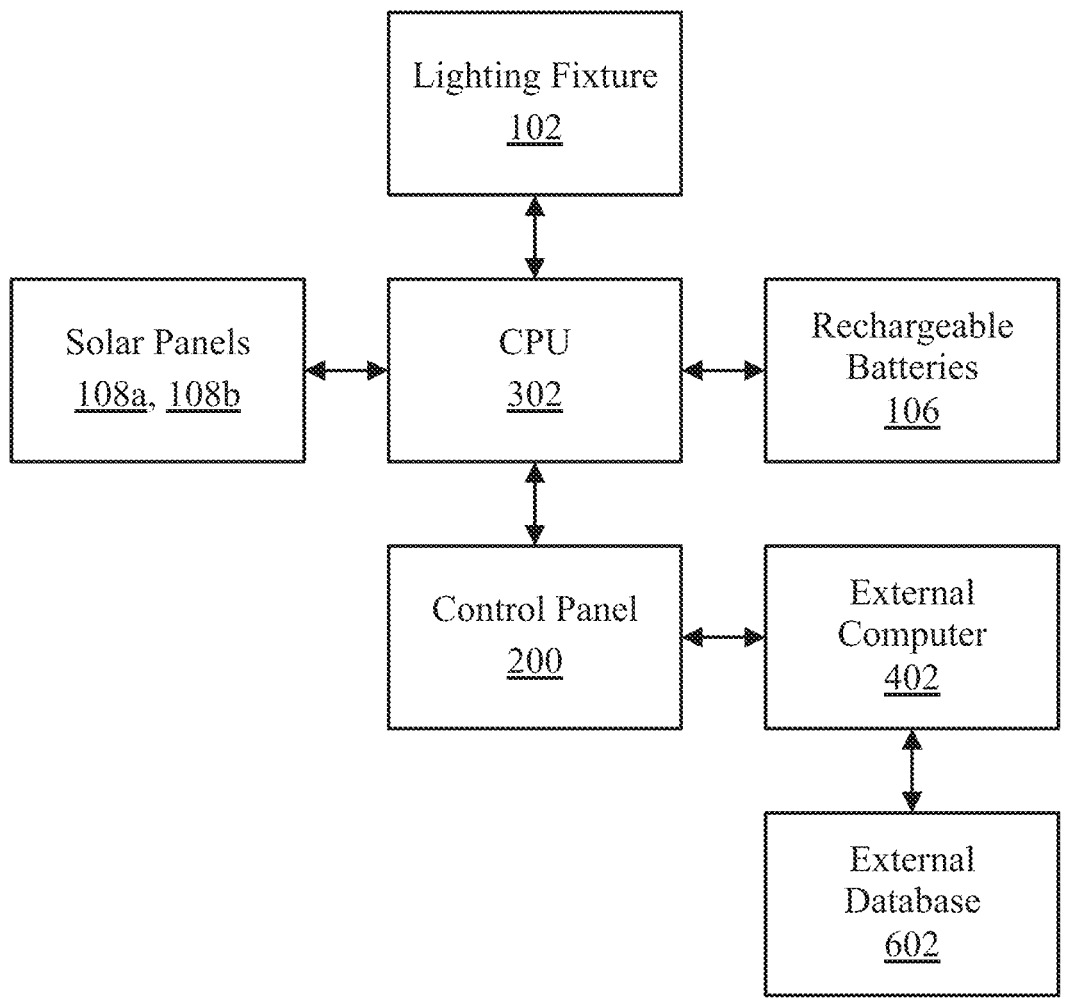
FIG. 6 is a block diagram of the devices that are used in running the portable solar lighting tower using a computer and also for displaying the energy management graph.

Referring now to FIG. 6, a block diagram of the components that are used in running the portable solar lighting tower 100 by a digital control panel 400 (shown in FIGS. 4A and 4B) on an external computer is shown. For operating the lighting tower 100 using the external computer 402, similar methods and features as described elsewhere herein may be used, particularly what has been described in FIG. 3. The major distinction in this embodiment may be that the external computer 402 may be connected to the control panel 200 (shown in FIG. 2) to communicate the execution of different modes and features. Such communication is ultimately transferred to the processor 302 via the control panel 200. The processor 302 may be integrated or separate from the control panel 200. In another example, the computer tablet 402 may be directly connected to the processor 302 in order to send and receive information pertaining to the portable solar lighting tower 100. In addition to the processing unit 302 executing the modes and features described in relations to FIG. 3, the processing unit 302 may also execute the solar panel selection 426, the wattage adjustment 428, and the battery selection 430 features shown on the control panel 400 in FIG. 4B. The processing unit 302 may also calculate the life cycle statistics 432, the maximum brightness 434 statistics, and the $CO_2$ production 440 statistics shown in FIG. 4B. Alternatively, the external computer 402 displaying the digital control panel 400 may calculate the aforementioned statistics via the installed software.

For displaying the energy management graph 404, the processor of the computer 402 may execute the commands of displaying the graph. The external computer 402 may need to connect and receive data from the portable solar lighting tower 100 and from an outside database 602. The external computer 402 may receive data from the portable solar lighting tower 100 pertaining to the current active modes and features described elsewhere herein. Such data may be received by the computer 402 from the control panel 200 or the processor 302. Such data may allow the external computer 402 to display the one or more demand curves 406a-c of the graph 404 (shown in FIG. 4). The displaying of the demand curve 406a-c may be executed by the processor of the external computer 402 running the computer software for displaying the energy management graph 404.

The external computer 402 may also receive data from an external database 602 pertaining to the weather patterns, daylight hours, and other relevant data discussed elsewhere herein to display the supply curve 408 shown in FIGS. 4A, 4B, 5A, and 5B. The external database 602 may send such data pertaining to a specific location, which may be where the portable solar lighting tower 100 is located. Such data from the external database 602 may allow for the computer tablet 402 to display the supply curve 408 of the energy management graph 404. The data for displaying the supply 408 may have already been processed and calculated by the external database 602, or the external computer 402 may have to process and calculate the data to form the supply curve 408. The displaying of the supply curve 408 may be done by the processor of the external computer 402 that execute the commands for displaying the energy management graph 404. The weather data used for the supply curve and stored in the external database 602 may from previously collected years or may be real-time weather data, as described elsewhere herein. After receiving all of the needed data, the computer tablet 402 may then generate the energy management graph 404. The energy management graph 404 may additionally be altered and updated by the external computer 402 when new data is received from either the portable solar lighting tower 100 or the external database 602. Such new and updated data may pertain to either the one or more demand curves 406a-c or the supply curve 408, such as a change in the active modes and features, a change in the zip code of where the portable solar lighting tower 100 is located, or other relevant data discussed elsewhere herein.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A portable solar lighting tower for use at a construction site, comprising:
   a frame;
   an LED light attached to the frame;
   a power source in electrical communication to the LED light for powering the LED light;
   a control panel in electrical communication with the LED light and the power source-for controlling operation thereof:
   a button in electrical communication with the LED light for turning the LED light on or off:
   an eco-mode button for setting a brightness of the LED light to a fraction of a set brightness of the LED light; and
   a motion mode button for dimming the LED light based on absence of motion near the frame;
   time increment buttons for configuring how long after sunset the LED light should turn off.

2. The portable solar lighting tower of claim 1, wherein the control panel further comprises an all-night button to turn on the LED light between sunrise and sunset.

3. The portable solar lighting tower of claim 2, wherein the control panel further comprises a battery status indicator for displaying remaining voltage of the battery.

4. A portable solar lighting tower for use at a construction site, comprising,
   a frame;
   an LED light attached to the frame;
   a power source in electrical communication to the LED light for powering the LED light;

a control panel in electrical communication with the LED light and the power source-for controlling operation thereof:
  a button in electrical communication with the LED light for turning the LED light on or off;
  an eco-mode button for setting a brightness of the LED light to a fraction of a set brightness of the LED light; and
  a motion mode button for dimming the LED light based on absence of motion near the frame;
a wireless antenna for receiving and sending data to and from an external computer, the external computer configured to activate and deactivate the operations of the portable solar lighting tower represented by the buttons on the control panel.

5. The portable solar lighting tower of claim 4, wherein the external computer is configured to produce an energy management graph, the energy management graph having a power supply line and a demand line, the demand line based on a function of a brightness setting, a lamp setting, and a time increment setting.

6. The portable solar lighting tower of claim 5, wherein the wireless antenna is a Bluetooth antenna.

7. A portable solar lighting tower for use at a construction site, comprising
  a frame;
  an LED light attached to the frame;
  a power source in electrical communication to the LED light for powering the LED light;
  a control panel in electrical communication with the LED light and the power source-for controlling operation thereof:
    a button in electrical communication with the LED light for turning the LED light on or off;
    an eco-mode button for setting a brightness of the LED light to a fraction of a set brightness of the LED light; and
    a motion mode button for dimming the LED light based on absence of motion near the frame wherein the motion mode button reduces the brightness of the LED light an additional fraction in addition to the fraction of the brightness when both the eco-mode button and the motion mode button are active.

8. The portable solar lighting tower of claim 2, wherein the control panel further comprises a fourth button for selecting which days of a week the LED light should automatically turn on after sunset.

9. A method for managing a power output of a portable solar lighting tower used at a construction site, comprising:
  generating a demand level based on power demand settings of the portable solar lighting tower;
  generating a supply level based on a solar pattern;
  turning off functions of the portable solar lighting tower when the supply level is lower than the demand level to bring the demand level lower than the supply level;
  wherein a plurality of days of the supply and demand levels are plotted on a graph to visually depict supply and demand curves having a measurement of energy on a vertical axis and measurement of time on a horizontal axis.

10. The method of claim 9, wherein the measurement of time spans a period of one year.

11. A method for managing a power output of a portable solar lighting tower used at a construction site, comprising:
  generating a demand level based on power demand settings of the portable solar lighting tower;
  generating a supply level based on a solar pattern;
  turning off functions of the portable solar lighting tower when the supply level is lower than the demand level to bring the demand level lower than the supply level;
  wherein the demand level depends on a brightness level setting of an LED light and duration of time that the LED light of the portable solar lighting tower is projected to be turned on.

12. The method of claim 11, wherein the solar pattern is downloaded and is a multi-year average based on a location of the construction site.

13. The method of claim 11, wherein a data of a current brightness configuration is dependent on an eco-mode feature of the portable solar lighting tower that set the brightness of the LED light to a fraction of an initial brightness of the LED light after a first interval of time has passed.

14. The method of claim 11, wherein a data of a current brightness configuration is dependent on a motion mode feature of the portable solar lighting tower that dim the LED light based on absence of motion near a lighting fixture after a second interval of time has passed.

15. The method of claim 12, wherein the demand level or the supply level updates based on altering an amount of brightness of the LED light when the LED light is turned on or changing a first processed weather pattern data to a second processed weather pattern data.

* * * * *